(12) United States Patent
Oikawa et al.

(10) Patent No.: US 7,440,648 B2
(45) Date of Patent: Oct. 21, 2008

(54) WAVELENGTH SELECTIVE SWITCH

(75) Inventors: Yoichi Oikawa, Yokohama (JP);
Kazuaki Akimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 11/157,985

(22) Filed: Jun. 22, 2005

(65) Prior Publication Data
US 2006/0198583 A1 Sep. 7, 2006

(30) Foreign Application Priority Data
Mar. 7, 2005 (JP) ............................. 2005-061865

(51) Int. Cl.
*G02B 6/26* (2006.01)
(52) U.S. Cl. .......................................... 385/16; 385/18
(58) Field of Classification Search ........................ None
See application file for complete search history.

(56) References Cited

U.S. PATENT DOCUMENTS

| | | | |
|---|---|---|---|
| 5,652,767 A | 7/1997 | Kiyonaga et al. | |
| 6,263,123 B1 | 7/2001 | Bishop et al. | |
| 6,263,127 B1 | 7/2001 | Dragone et al. | |
| 6,487,336 B1 | 11/2002 | Yao | |
| 6,549,699 B2 | 4/2003 | Belser et al. | |
| 7,103,258 B2* | 9/2006 | Katsunuma | ................. 385/140 |
| 7,263,254 B2* | 8/2007 | Yamashita et al. | ............ 385/18 |
| 2005/0074204 A1* | 4/2005 | Wilson et al. | ................. 385/24 |
| 2005/0238285 A1* | 10/2005 | Takushima et al. | ............ 385/24 |
| 2006/0039669 A1* | 2/2006 | Katsunuma | ................. 385/140 |

FOREIGN PATENT DOCUMENTS

| | | |
|---|---|---|
| JP | 5-88216 | 4/1993 |
| JP | 7-190887 | 7/1995 |
| JP | 7-307764 | 11/1995 |
| JP | 2000-347065 | 12/2000 |
| JP | 2001-330865 | 11/2001 |

* cited by examiner

*Primary Examiner*—Sung H Pak
(74) *Attorney, Agent, or Firm*—Staas & Halsey LLP

(57) ABSTRACT

A wavelength selective switch of the invention separates WDM light coming out from an input fiber of a fiber collimator array according to its wavelength, in a diffraction grating, and reflects each wavelength channel proceeding in different directions by MEMS mirrors corresponding to a mirror array. In the MEMS mirrors, the angles of their reflecting surfaces are set corresponding to the location of the output port which is set in the output address of the wavelength channel to be injected. For each of the wavelength channels that reach the target output port, one part of each is reflected by the end face of an output fiber, and the reflected light is returned to the input port, and sent to a channel monitor via an optical circulator, so that the optical power corresponding to each wavelength channel is monitored. As a result it is possible to provide a small size, and low-cost, wavelength selective switch, that can monitor the power of each wavelength channel guided to a plurality of output ports, with good accuracy.

13 Claims, 10 Drawing Sheets

WAVELENGTH SELECTIVE SWITCH

BACKGROUND OF THE INVENTION

(1) Field of the Invention

The present invention relates to a wavelength selective switch that can select a desired wavelength channel from a wavelength division multiplexed (WDM) light applied to an input port, and output it to a target output port. In particular, it relates to a wavelength selective switch that has a function for monitoring the optical power output from a plurality of output ports.

(2) Description of Related Art

The recent rapid spread of high speed access networks that have bandwidths of approximately several Mbit/s to 100 Mbit/s, such as FTTH (Fiber to The Home), ADSL (Asymmetric Digital Subscriber Line), and the like, has created an environment in which broad bandwidth internet services can be received. In order to deal with the increase in communication demand under such conditions, mass storage optical communication systems in which wavelength division multiplexing (WDM) techniques are used, are being built into backbone networks (core networks).

In the connections between the above-described core networks and Metropolitan Area Networks that users access directly, there are concerns about the occurrence of bandwidth bottle necks due to limitations in electrical switching capability. Therefore, it is effective to provide new optical switching nodes in metropolitan regions that have become bandpass bottle necks, and build new photonic network architectures for connecting between core networks and metropolitan area networks directly in the optical domain without the intervention of electrical switches. Hence, a lot of effort is being put into research and development to realize this.

As one type of optical switch module to be used as a node for connecting core networks and metropolitan area networks, for example a wavelength selective switch (WSS) is known (for example, refer to U.S. Pat. No. 6,549,699, Japanese Unexamined Patent Publication No. 2000-347065, and Japanese Unexamined Patent Publication No. 2001-330865)

FIG. 15 is a perspective view showing a structural example of a conventional wavelength selective switch.

In FIG. 15, a wavelength selective switch 100 comprises a fiber collimator array 110, a diffraction grating 101, a lens 102, a mirror array 103, and a ¼ wave plate 104. The fiber collimator array 110 has N ($\geq$3) fiber collimators placed side by side in one direction, and constitutes one input port 110-1 and a plurality of output ports 110-2 to 110-N. After a WDM light coming out from the input port 110-1 is separated by the diffraction grating 101 in directions with different angles depending on their wavelengths, lights of each wavelength (referred to hereunder as wavelength channel) are focused onto different locations by the lens 102. At the location where the wavelength channels are focused, a mirror array 103 having a plurality of MEMS mirrors corresponding to the number of channels is placed. The MEMS mirrors are micro mirrors formed by using a micromachining (Micro Electro Mechanical System: MEMS) technique, and the angles of each of their reflecting surfaces can be controlled in accordance with a drive signal. Each of the wavelength channels that reach the mirror array 103 is reflected by a corresponding MEMS mirror, and returned in a direction according to the angle of the respective reflecting surfaces. At this time, by being controlled to a predetermined angle corresponding to the location of any one of the output ports, which is set in the output address of the wavelength channel to be injected, the wavelength channel returned by each of the MEMS mirrors passes through the lens 102, the ¼ wavelength plate 104, and the diffraction grating 101 in order, and is guided to a respective target output port.

FIG. 16 is a perspective view showing another structural example of a conventional wavelength selective switch. The wavelength selective switch 100' is different from the structural example shown in FIG. 15 in that a transmission type diffraction grating 101' is used. The other structures are the same as in the case of FIG. 15.

The conventional wavelength selective switches 100 and 100' as described above have a wavelength selective function whereby, with respect to a plurality of wavelength channels contained in an input WDM light, a desired wavelength channel can be selected and guided to a target output port by controlling the angles of the reflecting surfaces of each of the MEMS mirrors on the mirror array 103. Furthermore, by reversing the relationship between input and output, it is also possible to guide a WDM light containing different wavelength channels applied to a plurality of input ports, to one output port.

Regarding the conventional wavelength selective switches described above, it is important that the reflecting surface of each of the MEMS mirrors on the mirror array is controlled to be a predetermined angle. Therefore, a construction is proposed in which, as shown in FIG. 17 for example, an optical tap 120 is provided in each output fiber of the wavelength selective switch to branch part of the output light. The branched light from each of the optical taps is then applied to a spectrum monitor 121 to monitor the power of each of the wavelength channels, and the angles of the reflecting surfaces of corresponding MEMS mirrors on the mirror array are feedback controlled according to a control signal output from a processing unit 122 based on the monitored result (for example, refer to U.S. Pat. No. 6,549,699).

However, in the monitoring structure of an output light in the conventional wavelength selective switch as shown in the example of FIG. 17, it is necessary to provide individual optical taps to each of a plurality of output fibers. Therefore, there are problems in that the module size is increased due to the increase in the number of optical parts, and in that the cost increases.

As another structure for monitoring an output light in a conventional wavelength selective switch, as shown in FIG. 18 for example, it is also possible that an optical branching device, such as a prism or the like, is provided on the optical path between the mirror array and each of the output ports in the wavelength selective switch, and light branched by the optical branching device is received by a PD array, and the power of the light guided to each output port is monitored. However, in this construction, since any influence such as a shift in the optical axis of the optical parts after passing through the optical branching device is not contained in the optical power monitored by the PD array, there is a possibility that the power of the light physically guided to each output port, and the monitored power in the PD array do not match.

SUMMARY OF THE INVENTION

The present invention takes the above points into consideration, with an object of providing a small size, and low-cost, wavelength selective switch that can monitor the power of each wavelength channel guided to a plurality of output ports, with good accuracy.

In order to achieve the above-described object, a wavelength selective switch of the present invention is provided with: an optical input/output section, in which at least one input port and a plurality of output ports are arranged in a first direction; a spectroscopic section, that separates a wavelength multiplexed light containing a plurality of wavelength channels, outgoing from the input port, in a second direction different from the first direction according to their wavelengths; a plurality of movable mirrors that reflects each wavelength channel separated by the spectroscopic section by respective reflecting surfaces whose angles are variable; and a movable mirror driving section that sets the angles of the reflecting surfaces of each of the movable mirrors such that each of the wavelength channels reflected by each of the movable mirrors is inserted via the spectroscopic section into an output port set in an output address of an appropriate wavelength channel among the plurality of output ports. Furthermore, the wavelength selective switch is provided with: a reflection section, that is provided on the end face of each of the output ports, and reflects part of the wavelength channel injected from each of the movable mirrors via the spectroscopic section; a reflected light extracting section for obtaining light reflected by the reflection section and returned to the input port, from the input port; and a reflected light monitor section for monitoring the power of the reflected light obtained by the reflected light extracting section corresponding to each of the wavelength channels.

In a wavelength selective switch with such a construction, a WDM light outgoing from the input port of the optical input/output section is separated into individual wavelength channels by the spectroscopic section, and each of the wavelength channels traveling in different directions is reflected by a corresponding movable mirror. The angles of the reflecting surfaces of each of the movable mirrors are set to correspond to the locations of the output ports set in the output addresses of the wavelength channels to be injected, and the wavelength channels reflected by the reflecting surfaces are guided to the output ports in the output addresses via the spectroscopic section. Part of each of the wavelength channels reaching their target output ports is reflected by the reflection section provided on the output port end face, and the reflected light travels in the opposite direction down the previous optical path, and is returned to the input port. The reflected light returned to the input port is transmitted to the reflected light monitor section via the reflected light extracting section, and the optical power corresponding to each of the wavelength channels is monitored.

According to a wavelength selective switch of the present invention as described above, for each of the wavelength channels that go from the input port and are guided to target output ports, it is possible to monitor their connection states until they are injected into the output port end faces, with good accuracy, using a simple construction. As a result, it is possible to provide a small size, and low-cost wavelength selective switch with an output monitor function.

Other objects, features and advantages of the present invention will become apparent from the following description of embodiments, in conjunction with the appended drawings.

DETAILED DESCRIPTION OF THE INVENTION

Figure 1:
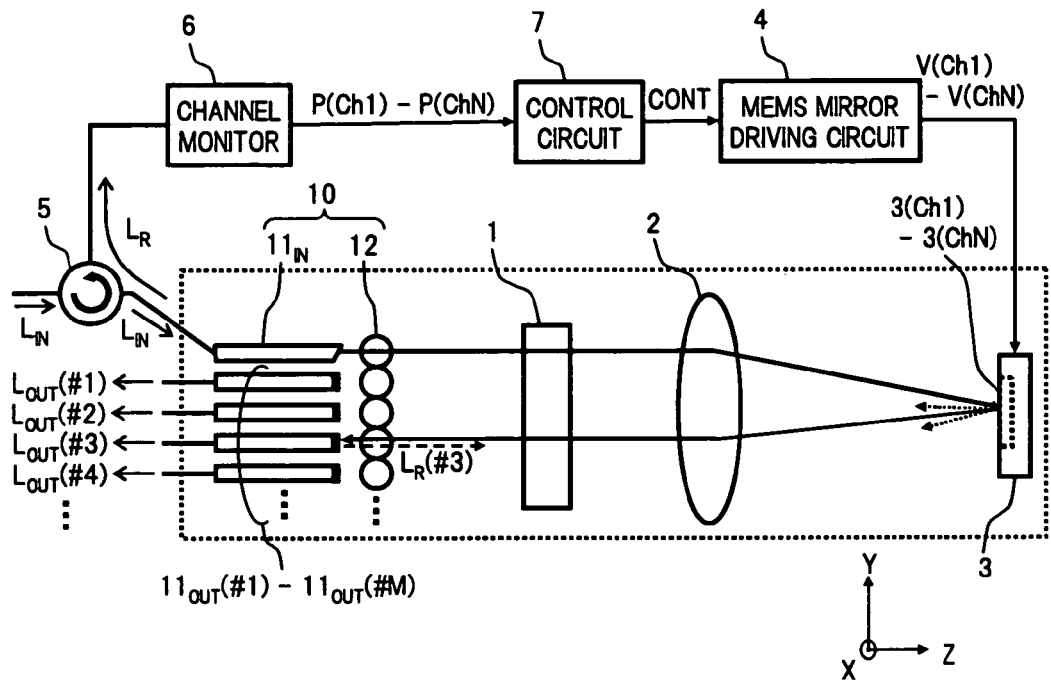
FIG. 1 is a diagram showing the structure of an embodiment of a wavelength selective switch according to the present invention.

Hereunder is a description of the best mode for carrying out the present invention, with reference to the appended drawings. Identical reference numerals denote identical or equivalent parts throughout all of the drawings.

FIG. 1 is a diagram showing the structure of an embodiment of a wavelength selective switch according to the present invention.

Figure 16:
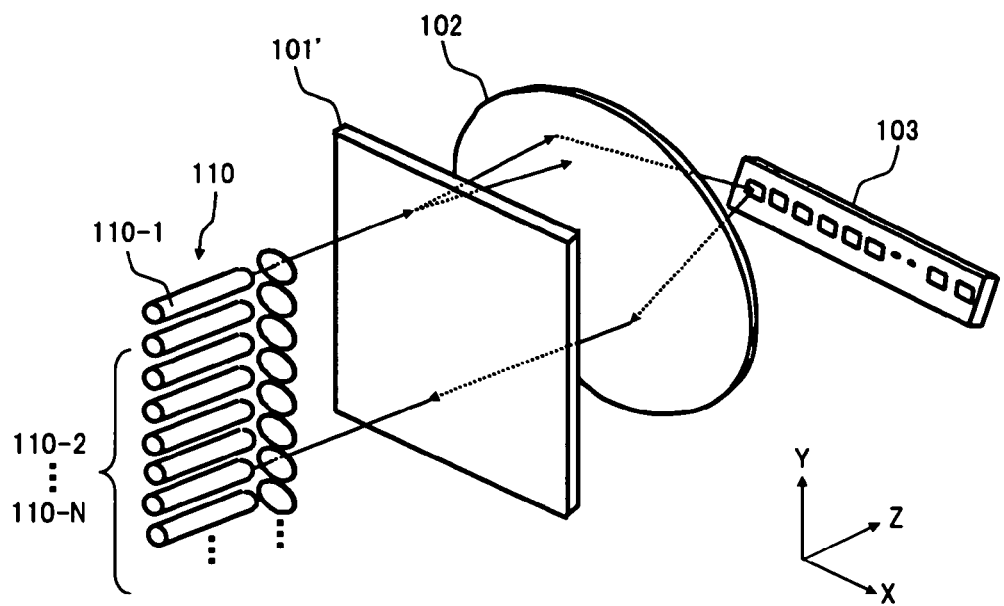
FIG. 16 is a perspective view showing another structural example of a conventional wavelength selective switch.

In FIG. 1, the wavelength selective switch of the present embodiment comprises for example: a fiber collimator array 10 serving as an optical input/output section; a diffraction grating 1 serving as a spectroscopic section; a condenser lens 2; a mirror array 3 in which a MEMS mirror, which is a plurality of movable mirrors, is arranged; an MEMS mirror drive circuit 4 serving as a movable mirror driving section; an optical circulator 5 serving as a reflected light extracting section; a channel monitor 6 serving as a reflected light monitor section; and a control circuit 7 serving as a control unit. The three-dimensional structure of the optical system of the present wavelength selective switch is for example the same as in the conventional case as shown in FIG. 16 described above.

The fiber collimator array 10 has one input fiber $11_{IN}$, M output fibers $11_{OUT}(\#1)$ to $11_{OUT}(\#M)$, and M+1 collimator lenses 12, one corresponding to each of the fibers. The input fiber $11_{IN}$ and the output fibers $11_{OUT}(\#1)$ to $11_{OUT}(\#M)$ are arranged side by side in the same direction (Y axis direction in a rectangular coordinate system as shown at the bottom right of FIG. 1).

Figure 2:
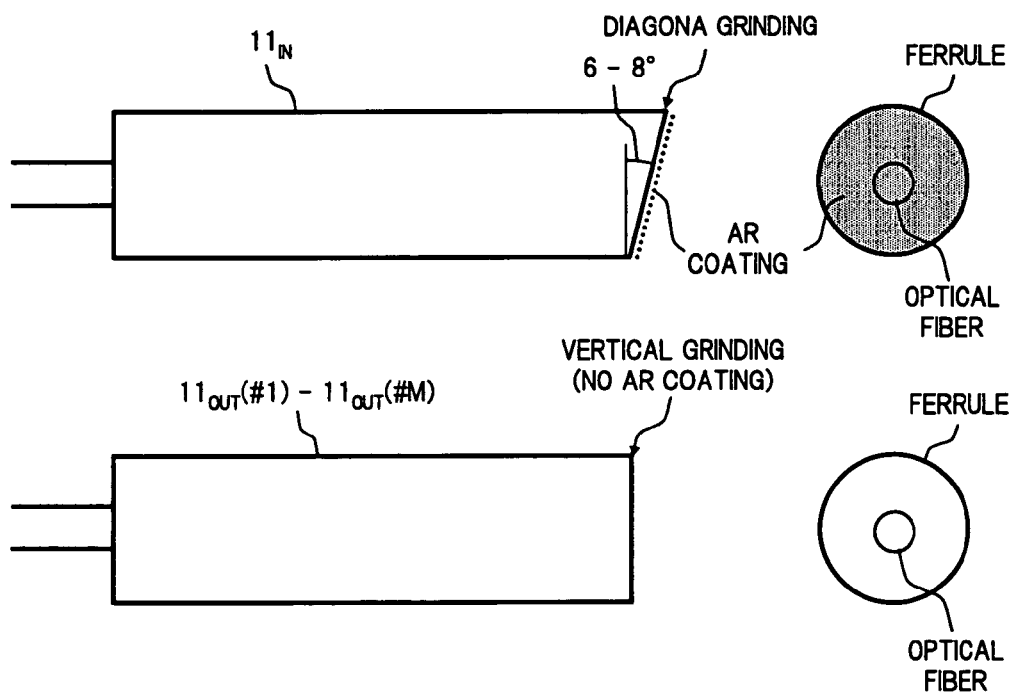
FIG. 2 is a diagram showing a specific structural example of an input fiber and an output fiber used in the embodiment.

An optical circulator 5 is connected to one end of the input fiber $11_{IN}$, and a WDM light $L_{IN}$ containing wavelength channels Ch1 to ChN (N channels of optical signals with mutually different wavelengths) is input thereto via the optical circulator 5. The other end of the input fiber $11_{IN}$ has a typical construction in which the ferrule end face is ground diagonally as shown in the top of FIG. 2 for example, and an AR (Anti-Reflection) coating is applied to the end face so that reflection of light at the fiber end face is prevented. Here the angle of inclination of the ferrule end face is 6 to 8 degrees.

Each of the lights for which the wavelength channels Ch1 to ChN of the WDM light $L_{IN}$ has been selected as desired and separated by the optical system comprising the diffraction grating 1, the condenser lens 2, and the mirror array 3, are injected into each of the output fibers $11_{OUT}(\#1)$ to $11_{OUT}(\#M)$ via corresponding collimator lenses 12. The construction of the optical injection end of each of the output fibers $11_{OUT}(\#1)$ to $11_{OUT}(\#M)$ is such that the ferrule end face is ground vertically as shown for example in the bottom of FIG. 2, and no AR coating is applied to the end face, so that part of the light injected via a collimator lens 12 from the above-described optical system is reflected at the fiber end face, and returned to the original optical path. In the case of a construction in which there is vertical grinding and no AR coating as described above, the reflection ratio at the end face of each of the output fibers $11_{OUT}(\#1)$ to $11_{OUT}(\#M)$ is approximately 4% (−14 dB). In the following description, the lights transmitted through the end faces of each of the output fibers $11_{OUT}(\#1)$ to $11_{OUT}(\#M)$ are output lights $L_{OUT}(\#1)$ to $L_{OUT}(\#M)$, and the reflected lights are reflected lights $L_R(\#1)$ to $L_R(\#M)$. The symbols #1 to #M in the brackets denote the output port numbers of the present wavelength selective switch.

Figure 15:
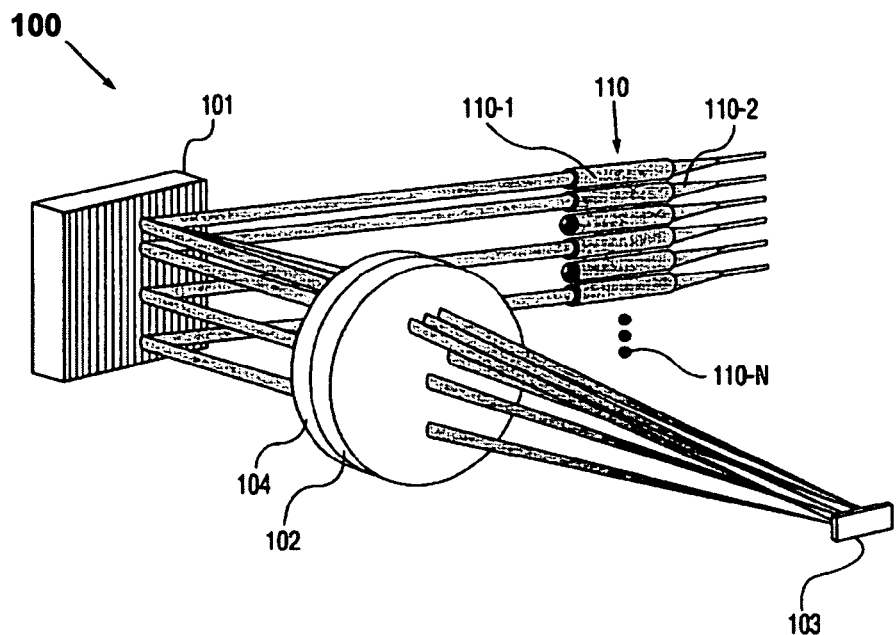
FIG. 15 is a perspective view showing a structural example of a conventional wavelength selective switch.

The diffraction grating 1 is a transmission type diffraction grating for separating, depending on their wavelengths, wavelength channels Ch1 to ChN contained in the WDM light $L_{IN}$ that is output from the input fiber $11_{IN}$, and made into parallel lights by the collimator lenses 12, in a different direction (X axis direction) from the arrangement direction (Y axis direction) of the fiber collimator array 10. In the present embodiment, a structural example is described in which a transmission type diffraction grating 1 is used. However, it is also possible to use a reflection type diffraction grating as shown in FIG. 15.

The condenser lens 2 is a typical lens for focusing each of the wavelength channels Ch1 to ChN separated in the X axis direction by transmission through the diffraction grating 1, onto corresponding MEMS mirrors in the mirror array 3.

The mirror array 3 has N MEMS mirrors 3(Ch1) to 3(ChN) arranged such that each reflecting surface is located at the focal point of each of the wavelength channels Ch1 to ChN which are transmitted through the condenser lens 2 (refer to FIG. 16). The MEMS mirrors 3(Ch1) to 3(ChN) are micro mirrors formed by using a micromachining (Micro Electro Mechanical System: MEMS) technique, and have a construction in which the angles of the reflecting surfaces can be controlled freely in accordance with drive voltages V(Ch1) to V(ChN) output from the MEMS mirror drive circuit 4. Here, the reflecting surfaces of each of the MEMS mirrors 3(Ch1) to 3(ChN) are controlled to predetermined angles corresponding to the location of any one of the output ports #1 to #M, as set in the output addresses of the wavelength channels Ch1 to ChN to be injected. As a result, the wavelength channels Ch1 to ChN, reflected by the respective MEMS mirrors 3(Ch1) to 3(ChN), pass through the condenser lens 2 and the diffraction grating 1 in order, and are respectively guided to the target output ports #1 to #M. FIG. 1 shows a wavelength channel path guided to output port #3, as an example of a wavelength channel path guided to an output port. The wavelength channels Ch1 to ChN guided to the respective target output ports #1 to #M are output from each of the output fibers $11_{OUT}(\#1)$ to $11_{OUT}(\#M)$ as the output lights $L_{OUT}(\#1)$ to $L_{OUT}(\#M)$ of the wavelength selection switch, except for reflected lights $L_R(\#1)$ to $L_R(\#M)$ that are reflected by the vertical end faces (refer to the bottom of FIG. 2) of the output fibers $11_{OUT}(\#1)$ to $11_{OUT}(\#M)$. The reflected lights $L_R(\#1)$ to $L_R(\#M)$ travel along the optical paths through which they were transmitted, in the reverse direction, and are thus combined, and reflected light $L_R$ containing components corresponding to each of the wavelength channels Ch1 to ChN is returned to the input port (input fiber $11_{IN}$).

The optical circulator 5 here has three ports, and transmits a WDM light $L_{IN}$ input to a first port to a second port to which the input fiber $11_{IN}$ is connected, in one direction, and transmits the reflected light $L_R$ returned to the second port from the input fiber $11_{IN}$ to a third port to which the channel monitor 6 is connected, in one direction.

The channel monitor 6 measures powers P(Ch1) to P(ChN) of the components corresponding to each of the wavelength channels Ch1 to ChN, which are contained in the reflected light $L_R$ output from the third port of the optical circulator 5, and outputs a signal indicating the measurement results to the control circuit 7.

Figure 3:
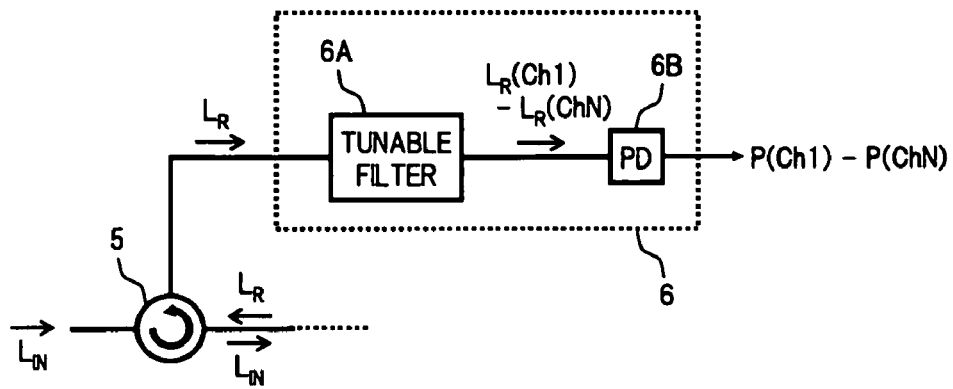
FIG. 3 is a diagram showing a specific structural example of a channel monitor in the embodiment.
Figure 4:
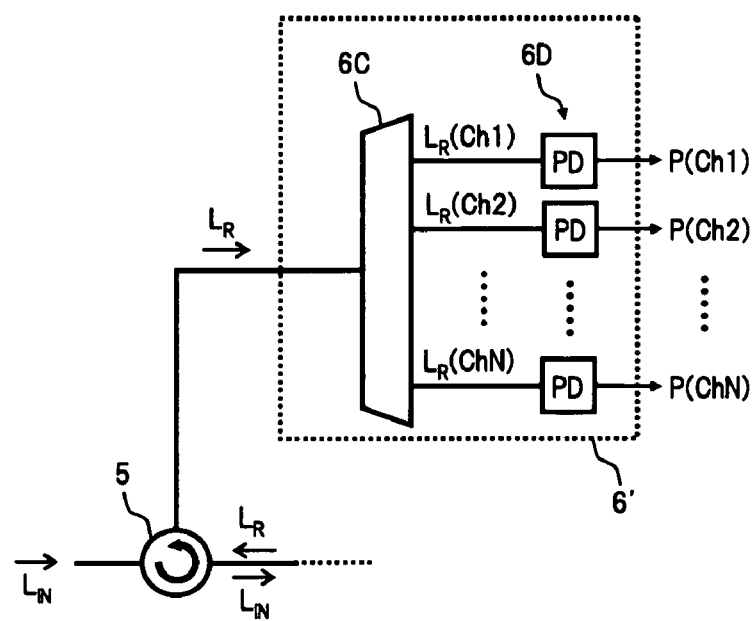
FIG. 4 is a diagram showing another specific structural example of a channel monitor in the embodiment.

FIG. 3 and FIG. 4 are block diagrams showing specific structural examples of the channel monitor 6. However, this does not mean that the channel monitor used for the present invention is limited to these structural examples.

In the structural example of FIG. 3, the reflected light $L_R$ from the optical circulator 5 is input to a tunable filter 6A, whose transmission band is variable, and any one of the lights $L_R(Ch1)$ to $L_R(ChN)$ corresponding to each of the wavelength channels contained in the reflected light $L_R$ is extracted, and its optical power is measured by a photo detector (PD) 6B. Here, by switching the transmission wavelength of the tunable filter 6A by time sharing corresponding to each of the wavelength channels, the powers of the lights corresponding to all of the wavelength channels contained in the reflected light $L_R$ are detected by the photo detector 6B.

Furthermore, in the structural example of FIG. 4, the reflected light $L_R$ from the optical circulator 5 is input to a demultiplexer 6C, and separated according to its wavelengths. Lights $L_R(Ch1)$ to $L_R(ChN)$ corresponding to each of the wavelength channels, which are output from respective output ports of the demultiplexer 6C, are received by photo detectors (PD) 6D1 to 6DN, provided corresponding to each, and the respective powers are detected.

The control circuit 7 generates a signal CONT for feedback control of the angles of the reflecting surfaces of the MEMS mirrors 3(Ch1) to 3(ChN) corresponding to each of the wavelength channels on the mirror array 3, based on the optical powers P(Ch1) to P(ChN) monitored by the channel monitor 6, such that each of the powers is at a maximum, and outputs it to a MEMS mirror drive circuit 4. The MEMS mirror drive circuit 4 optimizes the drive voltages V(Ch1) to V(ChN) applied to each of the MEMS mirrors 3(Ch1) to 3(ChN), in accordance with the control signal CONT from the control circuit 7.

In a wavelength selective switch with the construction described above, by using a structure as shown at the bottom of FIG. 2 for the end faces of each of the output fibers $11_{OUT}(\#1)$ to $11_{OUT}(\#M)$, which constitute the output ports #1 to #M, a reflection device is formed, and the lights $L_R(\#1)$ to $L_R(\#N)$ reflected at each of the output end faces travel through the optical system in reverse, and are returned to one input port collectively. Then, the light $L_R$ that returns to the input port is separated by the optical circulator 5 located in the input section, the powers P(Ch1) to P(ChN) of the lights corresponding to each of the wavelength channels Ch1 to ChN are monitored by the channel monitor 6, and feedback control of each of the MEMS mirrors 3(Ch1) to 3(ChN) is performed based on the monitored result.

Figure 5:
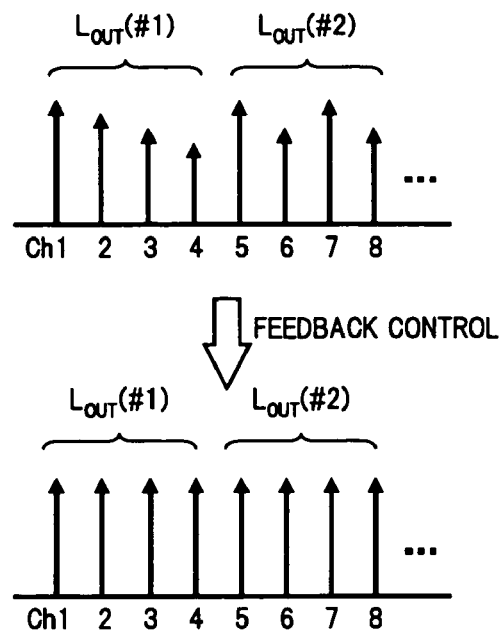
FIG. 5 is a diagram for explaining feedback control in the embodiment.
Figure 6:
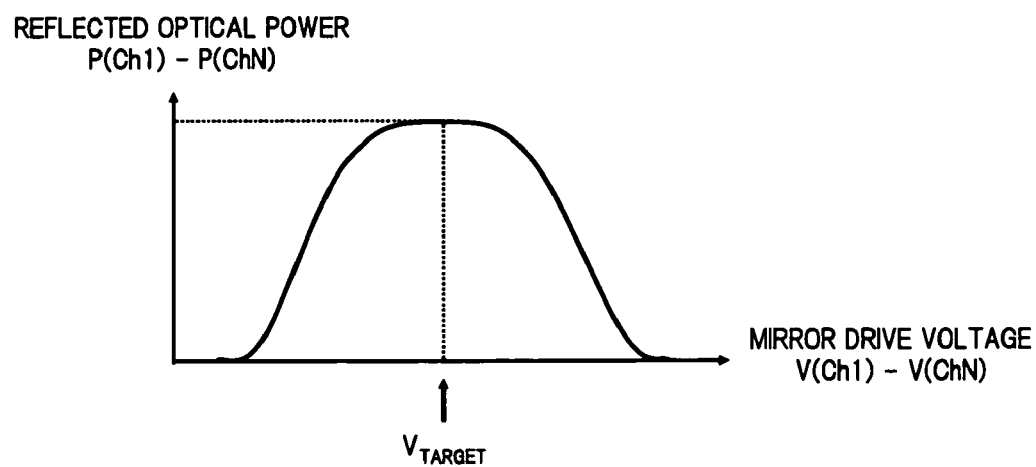
FIG. 6 is a diagram showing an example of the relationship between MEMS mirror drive voltage and the power of reflected light.

To be specific, for example as shown in FIG. 5, in the setting of an output address wherein wavelength channels Ch1 to Ch4 among the wavelength channels Ch1 to ChN of the input WDM light $L_{IN}$ are output from the output port #1, and wavelength channels Ch5 to Ch8 are output from the output port #2, in the case where the powers of the reflected lights corresponding to each of the wavelength channels Ch1 to Ch8 monitored by the channel monitor 6 are as shown at the top of FIG. 5, the control circuit 7 determines that the angles of the reflecting surfaces of each of the MEMS mirrors corresponding to the wavelength channels Ch2 to Ch4, and Ch6 to Ch8 are shifted from their optimum values, and feedback control of the corresponding MEMS mirrors is performed such that the monitored value of each of the reflected light powers is at its maximum as shown at the bottom of FIG. 5. The feedback control aims to optimize the drive voltage using the voltage $V_{TARGET}$, at which the reflected light power is at its maximum, as a control target, in the case where the drive voltages V(Ch1) to V(ChN) of the MEMS mirrors, and each of the reflected light powers P(Ch1) to P(ChN), change according to the relationship as shown for example in FIG. 6.

Figure 17:
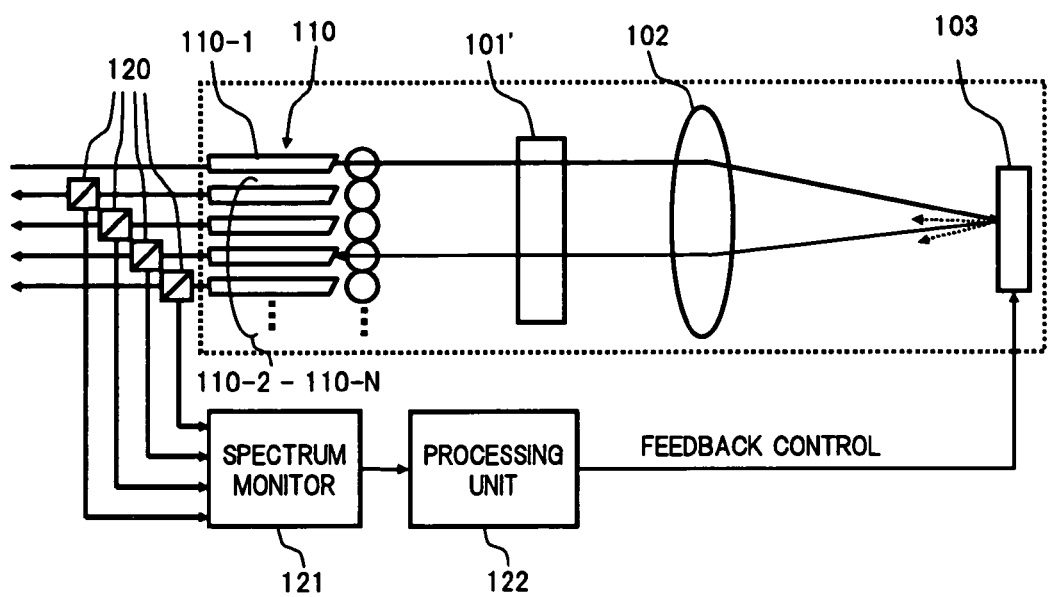
FIG. 17 is a diagram showing a structural example of an output monitor in the conventional wavelength selective switch.
Figure 18:
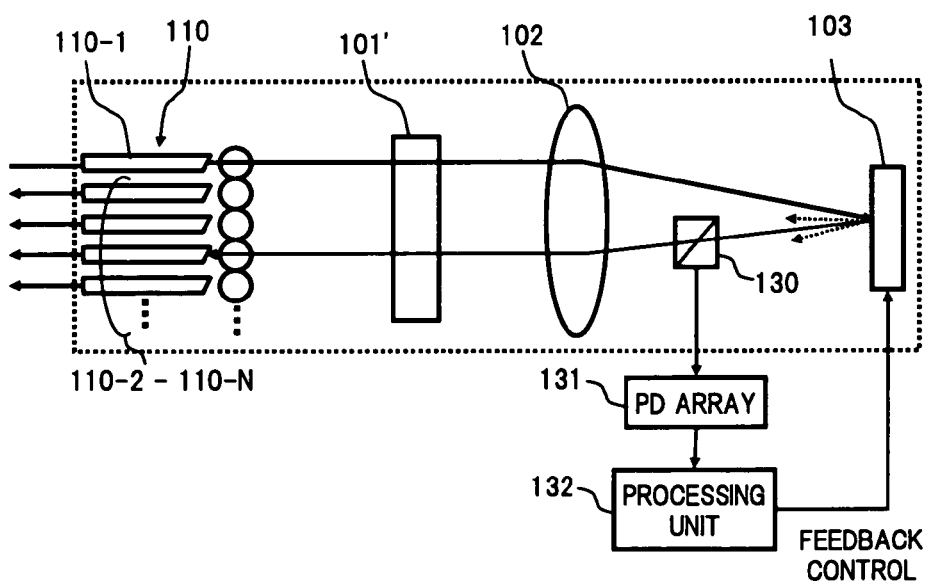
FIG. 18 is a diagram showing another structural example of the output monitor in the conventional wavelength selective switch.

According to a wavelength selective switch of the present embodiment as described above, for each of the wavelength channels Ch1 to ChN that are guided to the target output ports #1 to #M, it is possible to monitor their connection states until they reach the end faces of each of the output fibers $11_{OUT}$(#1) to $11_{OUT}$(#M), with good accuracy using a simple construction. As a result, even in the case where a change occurs in the drive characteristics of each of the MEMS mirrors 3(Ch1) to 3(ChN) of the mirror array 3 due to changes in the surrounding environment, age deterioration, and the like, by feedback control of each of the MEMS mirrors using the monitored result, it is possible to select a desired wavelength channel from the input WDM light $L_{IN}$, and guide it to a target output port in an optimum connection state. Furthermore, in the wavelength selective switch of the present embodiment, compared with the conventional structure in which a tap is provided in each one of a plurality of output ports as shown in FIG. 17, by simply placing an optical circulator in one input port, it is possible to obtain all of the reflected lights $L_R$(#1) to $L_R$(#M) corresponding to each of the output ports #1 to #M as monitor lights. Therefore, it is possible to realize a reduction in the number of optical parts, and low cost.

Next is a description of another embodiment of a wavelength selective switch according to the present invention. Here, an applied example is shown that is suited to the case where a wavelength selective switch is used as a variable optical attenuator (VOA) in correspondence with a WDM light.

Figure 7:
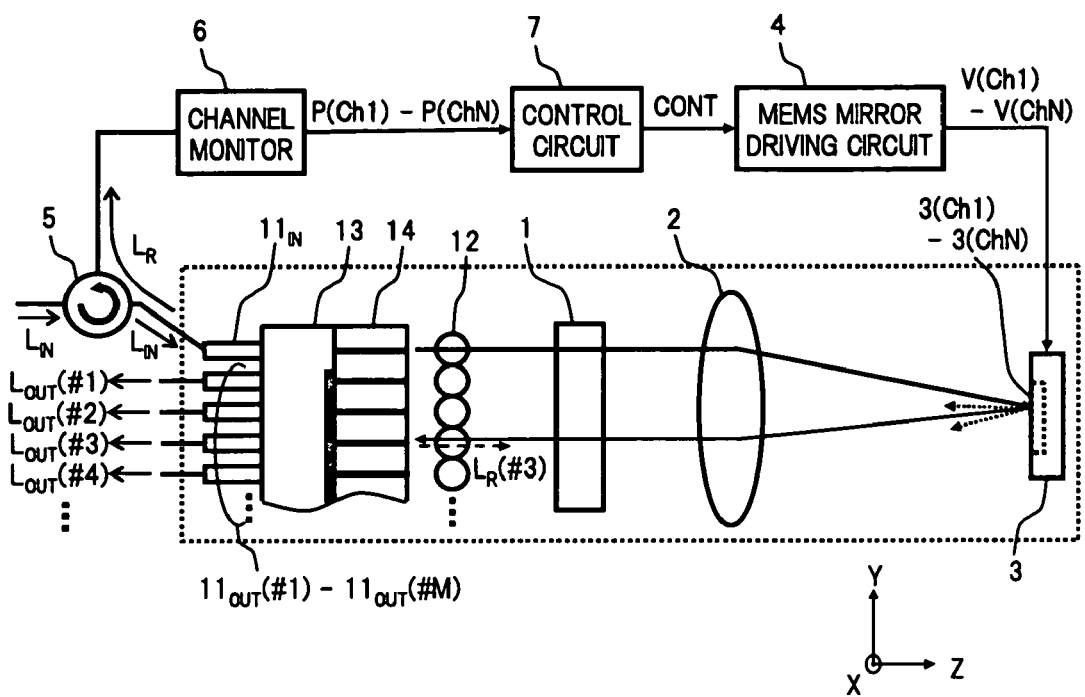
FIG. 7 is a diagram showing the structure of another embodiment of a wavelength selective switch according to the present invention.

FIG. 7 is a diagram showing the structure of a wavelength selective switch according to this other embodiment.

In FIG. 7, in order to be suitable for use as a variable optical attenuator, the wavelength selective switch of the present embodiment is provided with a block 13 for securing the ferrules of each of the input fiber $11_{IN}$ and the output fibers $11_{OUT}$(#1) to $11_{OUT}$(#M) in a predetermined location, in the structure shown in FIG. 1, and an array waveguide 14, in which optical guided wave paths are formed corresponding to the input fiber $11_{IN}$ and each of the output fibers $11_{OUT}$(#1) to $11_{OUT}$(#M), is provided between the block 13 and the collimator lens 12. The structures other than those described above are the same as in the case shown in FIG. 1, and hence their descriptions are omitted here.

The block 13 forms an input/output fiber array arranged in a single direction (Y axis direction), by forming for example parallel V slots at a predetermined spacing in advance, and laying the ferrules of the input fiber $11_{IN}$, and each of the output fibers $11_{OUT}$(#1) to $11_{OUT}$(#M), in the V slots. At this time, the vertically ground ferrule end faces (refer to the bottom of FIG. 2) of each of the output fibers $11_{OUT}$(#1) to $11_{OUT}$(#M), are placed side by side on one side face (right side face in FIG. 7) of the block 13, and the array waveguide 14 is placed such that it makes contact with that side face of the block 13. The crosshatched parts of the block 13 as shown in FIG. 7 are the ferrule end faces of each of the output fibers $11_{OUT}$(#1) to $11_{OUT}$(#M), that is, they illustrate schematically the locations corresponding to reflection devices.

In the array waveguide 14, one end face of each of the optical guided wave paths corresponding to the input fiber $11_{IN}$ and each of the output fibers $11_{OUT}$(#1) to $11_{OUT}$(#M) is connected to a corresponding end face of one of the input/output fibers located on one side face of the block 13. The collimator lenses 12 are located close to the other end faces of each of the optical guided wave paths, and lights input and output between the input fiber $11_{IN}$, the output fibers $11_{OUT}$(#1) to $11_{OUT}$(#M), and each of the collimator lenses 12 are transmitted via corresponding optical guided wave paths in the array wave guide 14.

Here is a brief description of the operation of a wavelength selective switch as a variable optical attenuator.

Figure 8:
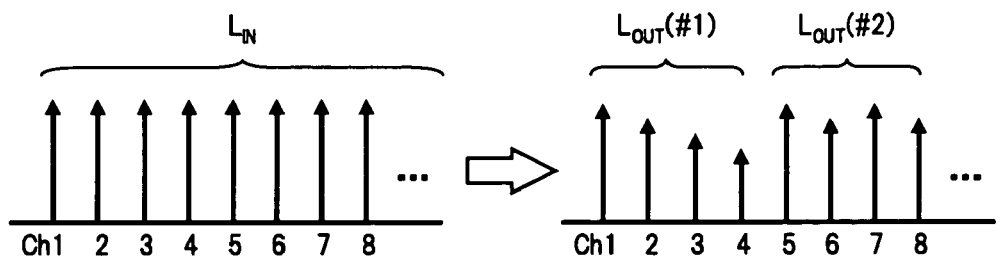
FIG. 8 is a diagram for explaining the operation of the wavelength selective switch serving as a VOA in the embodiment.

For example, a case is considered in which, as shown at the left side of FIG. 8, a WDM light $L_{IN}$ having a flat wavelength characteristic, in which the powers of each of the wavelength channels Ch1, Ch2, etc. are identical, is input to the wavelength selective switch, and as shown at the right side of FIG. 8, the light $L_{OUT}$(#1) output from the output port #1 of the wavelength selective switch has wavelength characteristics in which the powers of the wavelength channels Ch1 to ChN are reduced gradually according to their wavelengths, and the light $L_{OUT}$(#2) output from the output port #2 has wavelength characteristics in which the powers are different between odd and even numbered wavelength channels. In this case, for the wavelength channels Ch1, Ch5 and Ch7 contained in the input WDM light $L_{IN}$, the angles of the reflecting surfaces of respectively corresponding MEMS mirrors 3(Ch1), 3(Ch5), 3(Ch7) are optimized such that the optical powers reflected by the mirror array 3, and coupled to the cores of the target output fibers 11(#1) and 11(#2), are at the maximum. On the other hand, for the other wavelength channels Ch2 to Ch4, Ch6, and Ch8, based on the amount of attenuation in the powers of the wavelength channels Ch1, Ch5 and Ch7, by shifting the angles of the reflecting surfaces of the respectively corresponding MEMS mirrors 3(Ch2) to 3(Ch4), 3(Ch6) and 3(Ch8) from their optimum values, the optical powers coupled to the cores of the target output fibers 11(#1) and 11(#2) are attenuated. As a result, it is possible to let the lights $L_{OUT}$(#1) and $L_{OUT}$(#2) output from each of the output ports #1 and #2 have a desired wavelength characteristic. Therefore, the wavelength selective switch functions as a variable optical attenuator for each of the wavelength channels of the WDM light $L_{IN}$.

As described above, for a wavelength selective switch used as a variable optical attenuator, in the case where the structure of the present invention shown in FIG. 1 is applied, that is, a structure in which parts of the lights guided to each of the output fibers $11_{OUT}$(#1) to $11_{OUT}$(#M) passing through the collimator lenses 12 are reflected by each of the output fiber end faces, and the reflected and returned lights are monitored on the input side, by shifting the angles of the reflecting surfaces of the MEMS mirrors from their optimum values, since the lights (loss components that are not coupled inside the cores) that reach the cladding outside the cores on the output fiber end faces are also reflected by the respective fiber end faces, and returned to the input side, it is difficult to accurately monitor the powers of the lights $L_{OUT}$(#1) to $L_{OUT}$(#M) output from each of the output ports, on the input side.

Therefore, in the present embodiment, by inserting the array waveguide 14 between the collimators 12 and each of the end faces of the input/output fibers arrayed using the block 13, only lights connected to each of the optical guided wave paths of the array waveguide 14 are guided to each of the output fibers $11_{OUT}$(#1) to $11_{OUT}$(#M), and parts of them are reflected and returned to the input side. That is, the loss components generated by shifting the angles of the MEMS mirrors, reach to outside the end faces of the optical guided wave paths in the array waveguide 14, but do not reach to the end faces of the output fibers, serving as reflecting devices. Hence it is possible to accurately monitor the powers of the lights $L_{OUT}$(#1) to $L_{OUT}$(#M) output from each of the output ports, on the input side.

According to the present embodiment as described above, also for a wavelength selective switch used as a variable optical attenuator associated with a WDM light, similarly to the case of the aforementioned embodiment shown in FIG. 1, it is possible to accurately monitor the power of the lights $L_{OUT}$(#1) to $L_{OUT}$(#M) output from each of the output ports #1 to #M, using a simple structure. That is, by applying the monitor structure of the present invention to the case where the wavelength selective switch is used as a variable optical attenuator, it is possible to accurately monitor the optical attenuation amount associated with each wavelength channel. Furthermore, by feedback control of the angles of the reflecting surfaces of each of the MEMS mirrors 3(Ch1) to 3(ChN) based on the monitored result, it is possible to reliably guide the wavelength channels whose powers are adjusted to preset levels, to the target output ports.

Figure 9:
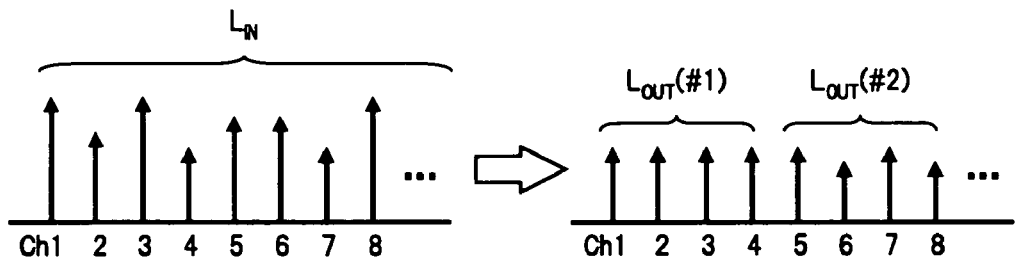
FIG. 9 is a diagram for explaining another VOA operation associated with the embodiment.
Figure 10:
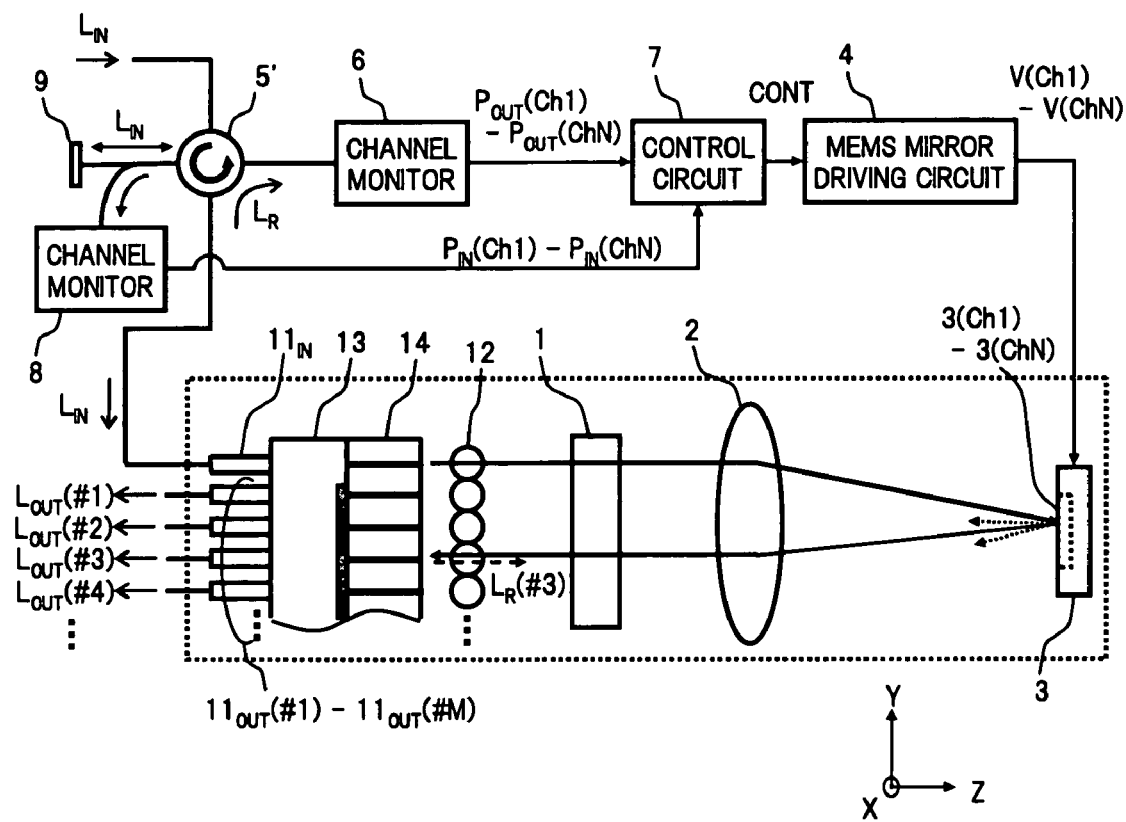
FIG. 10 is a diagram showing a modified example of a wavelength selective switch, corresponding to the VOA operation of FIG. 9.

In the above-described embodiment, a case is described in which a WDM light $L_{IN}$ having flat wavelength characteristics is input, and the wavelength selective switch is operated as a variable optical attenuator such that the absolute values of the powers of each of the wavelength channels Ch1 to ChN output to the target output ports reach desired levels. However, as well as this, the structure of the present invention is effective also in the case where, when the wavelength characteristics of the WDM light $L_{IN}$ input to the wavelength selective switch are not flat, for example as shown at the left side of FIG. 9, by adjusting the relative powers of each of the wavelength channels guided to the target output ports, the wavelength selective is operated as a variable optical attenuator such that desired wavelength characteristics can be obtained for WDM lights $L_{OUT}$(#1) to $L_{OUT}$(#M) output from each of the output ports as shown at the right side of FIG. 9. FIG. 10 is a diagram showing a modified example of a wavelength selective switch corresponding to the above-described case.

In a wavelength selective switch as shown in FIG. 10, an optical circulator 5' having four ports is connected to an input fiber $11_{IN}$ such that the wavelength characteristics of an input WDM light $L_{IN}$ can also be monitored, and the angles of the reflecting surfaces of each of the MEMS mirrors 3(Ch1) to 3(ChN) are feedback controlled according to the relationship between the input powers of each of the wavelength channels Ch1 to ChN and their relative output powers.

To be specific, the WDM light $L_{IN}$ input to a first port of the optical circulator 5' is output from a second port, part of it is branched as an input monitor light and transmitted to a channel monitor 8 serving as an input monitor section, and the remainder of the WDM light $L_{IN}$ is totally reflected by a reflector 9, and returned to the second port. The WDM light $L_{IN}$ returned to the second port is applied to the input fiber $11_{IN}$ from a third port, and transmitted to the optical system of the wavelength selective switch similarly to the case of the embodiment shown in FIG. 7. Then, it is reflected by the end faces of each of the output fibers $11_{OUT}$(#1) to $11_{OUT}$(#M), and the reflected lights $L_R$ returned to the input fiber $11_{IN}$ are transmitted from the third port of the optical circulator 5' to a fourth port, and are applied to the channel monitor 6 on the output side. A control circuit 7 outputs to a MEMS mirror drive circuit 4, a signal CONT for filter control of the angles of the reflecting surfaces of the MEMS mirrors 3(Ch1) to 3(ChN) corresponding to each of the wavelength channels, such that the WDM lights $L_{OUT}$(#1) to $L_{OUT}$(#M) output from each of the output ports have desired wavelength characteristics, based on the input powers $P_{IN}$(Ch1) to $P_{IN}$(ChN) of each of the wavelength channels Ch1 to ChN monitored by the channel monitor 8 on the input side, and the optical powers $P_{OUT}$(Ch1) to $P_{OUT}$(ChN) corresponding to each of the wavelength channels Ch1 to ChN monitored by the channel monitor 6 on the output side.

Next is a description of another embodiment of a wavelength selective switch according to the present invention. Here, an example will be shown in which the present invention is applied to a wavelength selective switch having a plurality of input ports and a plurality of output ports.

Figure 11:
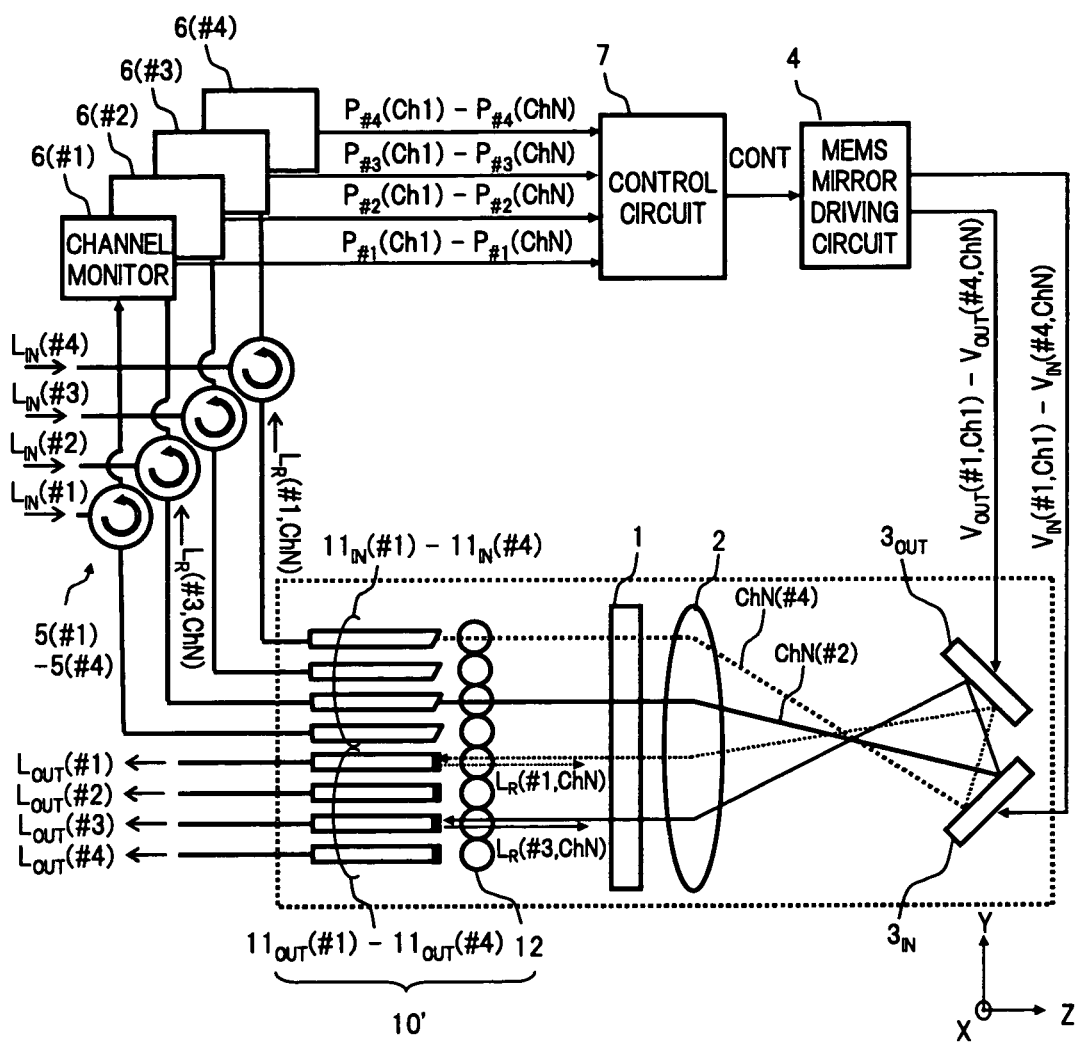
FIG. 11 is a diagram showing the structure of another embodiment of a wavelength selective switch according to the present invention.

FIG. 11 is a diagram showing the structure of a wavelength selective switch according to this other embodiment. Furthermore, FIG. 12 is a perspective view showing the arrangement of the optical system of the wavelength selective switch of FIG. 11.

Figure 12:
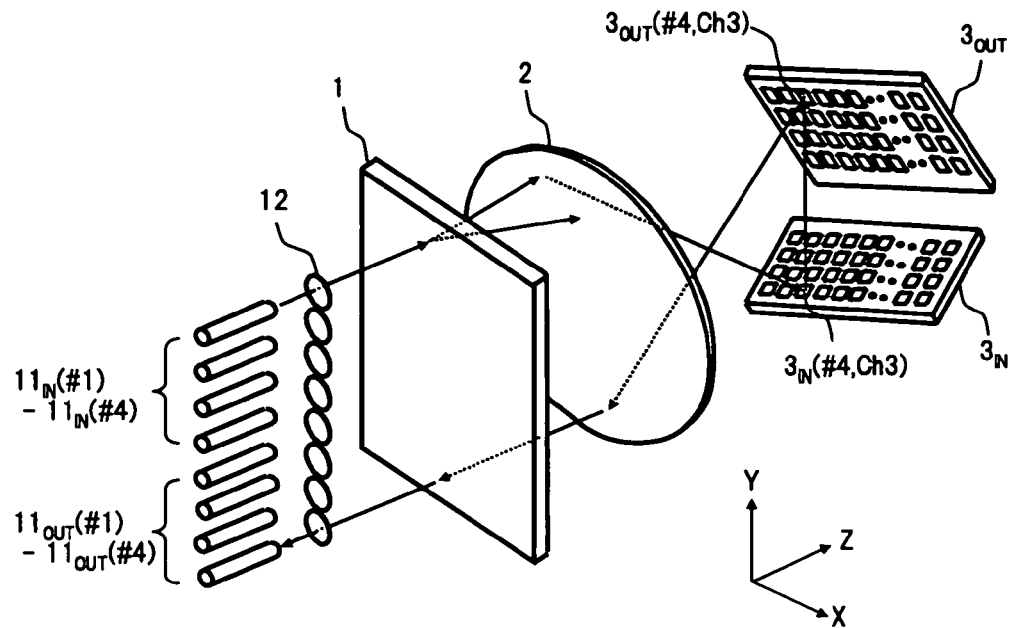
FIG. 12 is a perspective view showing the arrangement of the optical system of the wavelength selective switch of FIG. 11.

In FIG. 11 and FIG. 12, the present wavelength selective switch is provided with a fiber collimator array 10', in which for example, a plurality of M (here, M=4) input fibers $11_{IN}$(#1) to $11_{IN}$(#4), and a plurality of M (here, M=4) output fibers $11_{OUT}$(#1) to $11_{OUT}$(#4), are arranged side by side in one direction (Y axis direction), and collimator lenses 12 are provided corresponding to each of the fibers. Furthermore, an input side mirror array $3_{IN}$ and an output side mirror array $3_{OUT}$ are arranged in association with the plurality of input fibers. Moreover, corresponding to each of the input fibers $11_{IN}$(#1) to $11_{IN}$(#4) of the fiber collimator array 10', four optical circulators 5(#1) to 5(#4), and four channel monitors 6(#1) to 6(#4) are provided. Here, the structures other than the above-described fiber collimator array 10', input side mirror array $3_{IN}$, output side mirror array $3_{OUT}$, optical circulators 5(#1) to 5(#4), and channel monitors 6(#1) to 6(#4), are the same as the aforementioned structures shown in FIG. 1. Therefore, their descriptions are omitted here. Furthermore, in the present embodiment, one example of a 4×4 (four inputs, four outputs) wavelength selective switch is described. However, the present invention is not limited to this, and it is possible to set the number of input and output ports as desired.

Each of the input fibers $11_{IN}$(#1) to $11_{IN}$(#4) of the fiber collimator array 10' has a typical structure in which the ferrule end faces are ground diagonally similarly to the aforementioned structural example shown at the top of FIG. 2, and an AR coating is applied to the end faces, so that reflection of light at the fiber end faces is prevented. Furthermore, each of the output fibers $11_{OUT}$(#1) to $11_{OUT}$(#4) has a structure in which the ferrule end faces are ground vertically similarly to the aforementioned structural example shown at the bottom of FIG. 2, and no AR coating is applied to the end faces, so that part of the light guided via the collimator lenses 12 is reflected at the fiber end faces, and returned to the original optical path.

The WDM lights $L_{IN}(\#1)$ to $L_{IN}(\#4)$ output from each of the input fibers $11_{IN}(\#1)$ to $11_{IN}(\#4)$ are transmitted to a diffraction grating 1 via the collimator lenses 12, and separated into wavelength channels Ch1(#1) to ChN(#1), Ch1(#2) to ChN(#2), Ch1(#3) to ChN(#3), and Ch1(#4) to ChN(#4) contained in each, and then each of the wavelength channels Ch1(#1) to ChN(#4) is focused by a condenser lens 2, and transmitted to the input side mirror array $3_{IN}$.

The input side mirror array $3_{IN}$ has 4×N MEMS mirrors $3_{IN}(\#1, Ch1)$ to $3_{IN}(\#1, ChN)$, $3_{IN}(\#2, Ch1)$ to $3_{IN}(\#2, ChN)$, $3_{IN}(\#3, Ch1)$ to $3_{IN}(\#3, ChN)$, and $3_{IN}(\#4, Ch1)$ to $3_{IN}(\#4, ChN)$, which are arranged such that the reflecting surfaces are positioned at the focal locations of each of the wavelength channels Ch1(#1) to ChN(#4) passing through the condenser lens 2 (refer to FIG. 12). The input side mirror array $3_{IN}$ is here positioned such that it is at an angle of 45° with respect to the Z axis direction. Each of the MEMS mirrors $3_{IN}(\#1, Ch1)$ to $3_{IN}(\#4, ChN)$ has a structure in which the angles of the reflecting surfaces can be controlled freely in accordance with the drive voltages $V_{IN}(\#1, Ch1)$ to $V_{IN}(\#4, ChN)$ output from the MEMS mirror drive circuit 4. Here, the angles of the reflecting surfaces of each of the MEMS mirrors $3_{IN}(\#1, Ch1)$ to $3_{IN}(\#4, ChN)$ are controlled in agreement with the locations of the MEMS mirrors of the output side mirror array $3_{OUT}$, corresponding to any one of the output ports set in the output addresses of the wavelength channels Ch1(#1) to ChN(#4) to be injected.

The output side mirror array $3_{IN}$ is arranged such that it is at an angle of −45° with respect to the Z axis direction, and has 4×N MEMS mirrors $3_{OUT}(\#1, Ch1)$ to $3_{OUT}(\#1, ChN)$, $3_{OUT}(\#2, Ch1)$ to $3_{OUT}(\#2, ChN)$, $3_{OUT}(\#3, Ch1)$ to $3_{OUT}(\#3, ChN)$, and $3_{OUT}(\#4, Ch1)$ to $3_{OUT}(\#4, ChN)$ for reversing the direction of travel of each of the wavelength channels Ch1(#1) to ChN(#4) reflected by the input side mirror array $3_{IN}$, toward the target output ports (refer to FIG. 12). The angles of the reflecting surfaces of each of the MEMS mirrors $3_{OUT}(\#1, Ch1)$ to $3_{OUT}(\#4, ChN)$ are controlled in accordance with the drive voltages $V_{OUT}(\#1, Ch1)$ to $V_{OUT}(\#4, ChN)$ output from the MEMS mirror drive circuit 4.

Each of the optical circulators 5(#1) to 5(#4) has three ports similarly to the aforementioned optical circulator 5 shown in FIG. 1, and transmits in one direction WDM lights $L_{IN}(\#1)$ to $L_{IN}(\#4)$ input to the first port, to the second port to which each of the input fibers $11_{IN}(\#1)$ to $11_{IN}(\#4)$ are connected, and transmits in one direction the reflected light $L_R$ returned to the second port from each of the input fibers $11_{IN}(\#1)$ to $11_{IN}(\#4)$, to the third port to which each of the channel monitors 6(#1) to 6(#4) are connected.

The channel monitors 6(#1) to 6(#4) measure powers $P_{\#1}(Ch1)$ to $P_{\#1}(ChN)$, $P_{\#2}(Ch1)$ to $P_{\#2}(ChN)$, $P_{\#3}(Ch1)$ to $P_{\#3}(ChN)$, and $P_{\#4}(Ch1)$ to $P_{\#4}(ChN)$ of the optical components corresponding to each of the wavelength channels Ch1 to ChN, which are contained in the reflected light $L_R$ output from the third port of each of the optical circulators 5, and outputs a signal indicating the measurement results to the control circuit 7. For a specific example of each of the channel monitors 6(#1) to 6(#4), it is possible to apply the structure shown in FIG. 3 or FIG. 4.

The control circuit 7 generates a signal CONT for feedback controlling the angles of the reflecting surfaces of the MEMS mirrors $3_{IN}(\#1, Ch1)$ to $3_{IN}(\#4, ChN)$ corresponding to the input side mirror array $3_{IN}$, and the angles of the reflecting surfaces of the MEMS mirrors $3_{OUT}(\#1, Ch1)$ to $3_{OUT}(\#4, ChN)$ corresponding to the output side mirror array $3_{OUT}$, based on the powers $P_{\#1}(Ch1)$ to $P_{\#4}(ChN)$ of the reflected lights monitored by each of the channel monitors 6(#1) to 6(#4), such that each of the powers is at the maximum. The MEMS mirror drive circuit 4 optimizes the drive voltages $V_{IN}(\#1, Ch1)$ to $V_{IN}(\#4, ChN)$ applied to the input side MEMS mirrors $3_{IN}(\#1, Ch1)$ to $3_{IN}(\#4, ChN)$, and drive voltages $V_{OUT}(\#1, Ch1)$ to $V_{OUT}(\#4, ChN)$ applied to the output side MEMS mirrors $3_{OUT}(\#1, Ch1)$ to $3_{OUT}(\#4, ChN)$, in accordance with the control signal CONT from the control circuit 7.

Here is a detailed description of the feedback control of each of the MEMS mirrors by the control circuit 7 in the present embodiment, using a specific example.

For example, as shown in the example of the path of a light transmitted through the optical system in FIG. 11, a case is assumed in which for the WDM light $L_{IN}(\#2)$ output from the input fiber $11_{IN}(\#2)$, the output address of the wavelength channel ChN(#2) is set to the output fiber $11_{OUT}(\#3)$ (corresponding to the path indicated by the solid line), and for the WDM light $L_{IN}(\#4)$ output from the input fiber $11_{IN}(\#4)$, the output address of the wavelength channel ChN(#4) is set to the output fiber $11_{OUT}(\#1)$ (corresponding to the path indicated by the dotted line). In this case, the wavelength channel ChN(#2) of the WDM light $L_{IN}(\#2)$ is guided to the target output fiber $11_{OUT}(\#3)$ by being reflected in order by the input side MEMS mirror $3_{IN}(\#2, ChN)$ and the output side MEMS mirror $3_{OUT}(\#3, ChN)$, the angles of whose reflecting surfaces are set to predetermined initial values according to the setting of the output addresses. Furthermore, similarly to this, the wavelength channel ChN(#4) of the WDM light $L_{IN}(\#4)$ is reflected by the input side MEMS mirror $3_{IN}(\#4, ChN)$ and the output side MEMS mirror $3_{OUT}(\#1, ChN)$ in order, and guided to the target output fiber $11_{OUT}(\#1)$.

Part of the wavelength channel ChN(#2) reaching the output fiber $11_{OUT}(\#3)$ is reflected by the output fiber end face, and the reflected light $L_R(\#3, ChN)$ is returned to the input side. The reflected light $L_R(\#3, ChN)$ is transmitted from the optical circulator 5(#2) to the channel monitor 6(#2), and its power $P_{\#2}(ChN)$ is monitored. Moreover, part of the wavelength channel ChN(#4) reaching the output fiber $11_{OUT}(\#1)$ is similarly reflected by the output fiber end face, and the reflected light $L_R(\#1, ChN)$ is returned to the input side. The reflected light $L_R(\#1, ChN)$ is transmitted from the optical circulator 5(#4) to the channel monitor 6(#4), and its power $P_{\#4}(ChN)$ is monitored.

In the control circuit 7 receiving the monitored result from each of the channel monitors 6(#2), and 6(#4), by reference to the setting information of the output address of the wavelength channel ChN(#2), corresponding MEMS mirrors $3_{IN}(\#2, ChN)$, and $3_{OUT}(\#3, ChN)$ are specified on the input side and output side, and the angles of each of the reflecting surfaces are feedback controlled such that the monitored value $P_{\#2}(ChN)$ from the channel monitor 6(#2) is at the maximum. Furthermore, by referencing the setting information of the output address of the wavelength channel ChN(#4), corresponding MEMS mirrors $3_{IN}(\#4, ChN)$ and $3_{OUT}(\#1, ChN)$ are specified on the input side and output side, and the angles of each of the reflecting surfaces are feedback controlled such that the monitored value $P_{\#4}(ChN)$ from the channel monitor 6(#4) is at the maximum.

According to the present embodiment as described above, also in relation to a 4×4 wavelength selective switch, for each of the wavelength channels Ch1(#) to ChN(#4) contained in the WDM lights $L_{IN}(\#1)$ to $L_{IN}(\#4)$, which are output from each of the input fibers $11_{IN}(\#1)$ to $11_{IN}(\#4)$, it is possible to monitor their connection states until they reach the end faces of the target output fibers $11_{OUT}(\#1)$ to $11_{OUT}(\#4)$, with good accuracy, using a simple construction. As a result, by feedback controlling the angles of the reflecting surfaces of corresponding MEMS mirrors on the input side and the output side based on the monitored results, it is possible to select a desired wavelength channel from the WDM lights $L_{IN}$(#1) to $L_{IN}$(#4) applied to each of the input ports, and guide it to a target output port in an optimum connection state.

In the above-described embodiment, an example of an optical system is shown in which the input side mirror array $3_{IN}$ and the output side mirror array $3_{OUT}$ are arranged symmetrically by tilting them by ±45° with respect to the Z axis direction. However, the structure of the optical system of a wavelength selective switch having a plurality of input/output ports, to which the present invention can be applied, is not limited to the above-described example. Furthermore, similarly to the case shown in FIG. 7 and FIG. 10, by using the structure of the embodiment, it is also possible to handle a case where a wavelength selective switch having a plurality of input/output ports is used as a variable optical attenuator.

Next is a description of a modified example associated with each of the embodiments shown in FIG. 1 to FIG. 12.

In a wavelength selective switch according to each of the embodiments, since the construction is such that parts of the lights injected to a plurality of output fibers are reflected by respective fiber end faces, and returned to the input side, the reflection attenuation characteristics seen from the output port side of the wavelength selective switch are deteriorated due to reflection at the output fiber end face, which is sometimes a problem. In such a case, for example by applying the structure as shown in FIG. 13, it is possible to prevent deterioration of the reflection attenuation characteristics.

Figure 13:
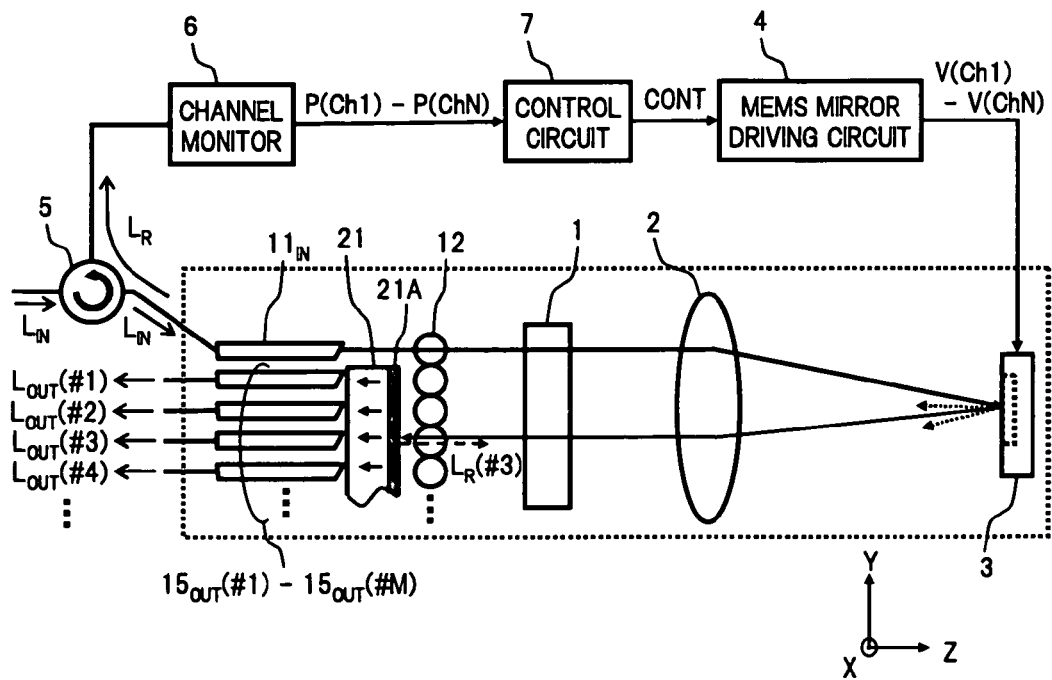
FIG. 13 is a diagram showing a modified example of the wavelength selective switch shown in FIG. 1.

To be specific, for example in the aforementioned structure shown in FIG. 1, instead of the output fibers $11_{OUT}$(#1) to $11_{OUT}$(#M), which form reflection devices by their end faces being ground vertically, the wavelength selective switch of FIG. 13 is provided with output fibers $15_{OUT}$(#1) to $15_{OUT}$(#M) having end faces ground diagonally, and to which an AR coating is applied similarly to the input fiber $11_{IN}$, and an isolator array 21 in which small size isolators are placed side by side is inserted between the output fibers $15_{OUT}$(#1) to $15_{OUT}$(#M) and collimator lenses 12, corresponding to each of the output fibers $15_{OUT}$(#1) to $15_{OUT}$(#M). A reflection section 21A for reflecting part of the light injected is formed on the end face of the isolator array 21 on the collimator lenses 12 side. For a specific example of a small size isolator used for this type of isolator array 21, it is possible to use a "miniature surface mount type optical isolator" manufactured by Sumitomo Metal Mining Co., Ltd.

In the structure as described above, lights passing through the collimator lenses 12 corresponding to each of the output ports #1 to #M are transmitted to each of the output fibers $15_{OUT}$(#1) to $15_{OUT}$(#M), via the isolator array 21, and parts of the lights input to the isolator array 21 from the collimator lenses 12 are reflected by the reflection section 21A, and returned to the input port side. Since the isolator array 21 cuts off light traveling from each of the output fibers $15_{OUT}$(#1) to $15_{OUT}$(#M) toward the collimator lenses 12, the reflection attenuation characteristics seen from the output port side of the wavelength selective switch become satisfactory.

Figure 14:
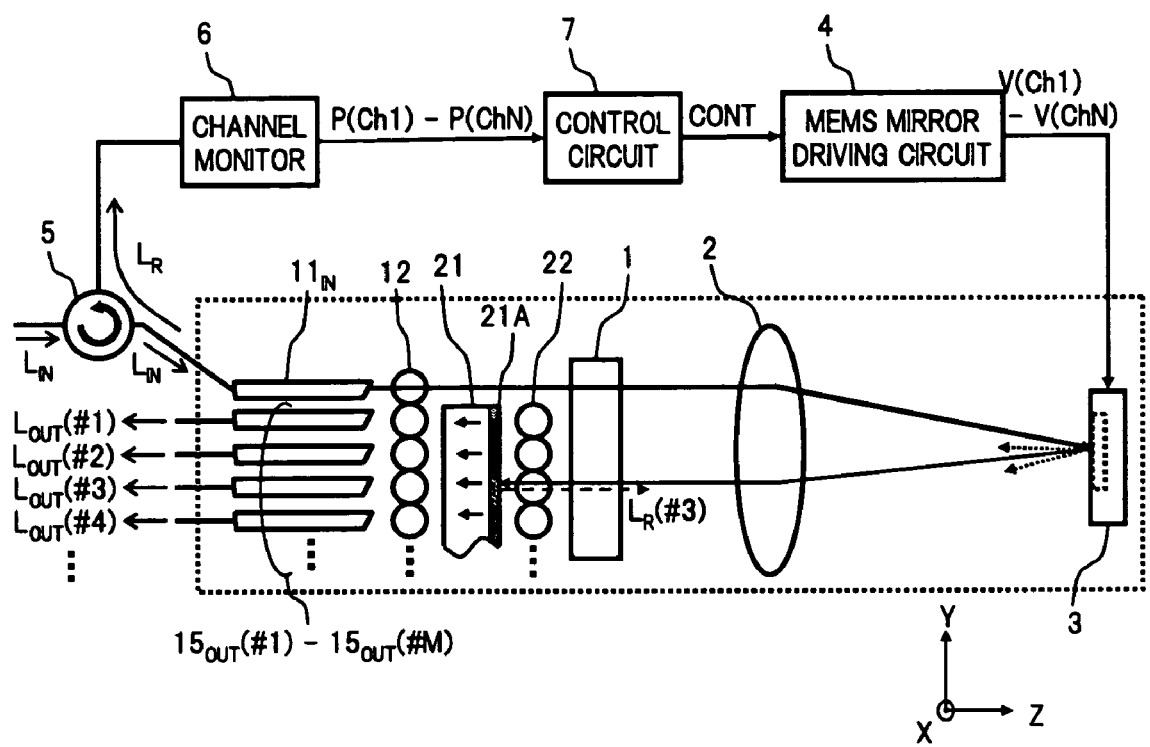
FIG. 14 is a diagram showing another structural example associated with the wavelength selective switch of FIG. 13.

In the structural example of FIG. 13, the isolator array 21 is arranged between the output fibers $15_{OUT}$(#1) to $15_{OUT}$(#M) and the collimator lenses 12. However, for example as shown in FIG. 14, the isolator array 21 may be provided between the collimator lenses 12 and the diffraction grating 1. Lenses 22 arranged close to the end face of the isolator array 21 focus light transmitted through the diffraction grating 1 onto the input end faces of each of the isolators.

Furthermore, in each of the aforementioned embodiments shown in FIG. 1 to FIG. 14, the case is shown in which optical powers P(Ch1) to P(ChN) corresponding to each of the wavelength channels, monitored by the channel monitor 6, are used for feedback control of the MEMS mirrors 3(Ch1) to 3(ChN). However, the present invention is not limited to this. For example it is also possible to use the monitored result from the channel monitor 6 in order to detect powers of the lights $L_{OUT}$(#1) to $L_{OUT}$(#M) output from each of the output ports #1 to #M.

What is claimed is:

1. An optical switch comprising:
    an optical input/output section, in which at least one input port and a plurality of output ports are arranged in a first direction;
    a spectroscopic section, that separates a wavelength multiplexed light containing a plurality of wavelength channels, outgoing from said input port, in a second direction different from said first direction according to their wavelengths;
    a plurality of movable mirrors that reflects each wavelength channel separated by said spectroscopic section by respective reflecting surfaces whose angles are variable; and
    a movable mirror driving section that sets the angles of the reflecting surfaces of each of said movable mirrors such that each of the wavelength channels reflected by each of said movable mirrors is inserted via said spectroscopic section into an output port set in an output address of an appropriate wavelength channel among said plurality of output ports,
    wherein there is provided:
    a reflection section, that is provided on the end face of each of said output ports, and reflects part of the wavelength channel injected from each of said movable mirrors via said spectroscopic section;
    a reflected light extracting section for obtaining light reflected by said reflection section and returned to said input port, from said input port; and
    a reflected light monitor section for monitoring the power of the reflected light obtained by said reflected light extracting section corresponding to each of the wavelength channels.

2. An optical switch according to claim 1, comprising a control section that feedback controls the angles of the reflecting surfaces of said movable mirrors corresponding to each of the wavelength channels, based on the monitor results of said reflected light monitor section, such that the power of the wavelength channels output from each of said output ports becomes close to a maximum value.

3. An optical switch according to claim 1, wherein the optical power output from each of said output ports is detected based on the monitor results of said reflected light monitor section.

4. An optical switch according to claim 1, comprising an array waveguide that has a plurality of optical waveguides corresponding to each of said output ports, and that connects one end of each of said optical waveguides to an end face provided with said reflection section of said output ports, and that inserts wavelength channels sent from each of said movable mirrors via said spectroscopic section, into another end of each of said optical waveguides.

5. An optical switch according to claim 4, comprising a control section that feedback controls the reflecting surfaces of said movable mirrors corresponding to each of the wavelength channels, based on the monitor results of said reflected light monitor section, such that the power of the wavelength channels output from each of said output ports becomes a previously set level.

6. An optical switch according to claim 4, comprising:
an input monitor section that monitors the power of each of the wavelength channels contained in the wavelength multiplexed light input to said input port; and
a control section that feedback controls of the angles of the reflecting surfaces of said movable mirrors corresponding to each of the wavelength channels, based on the respective monitor results of said input monitor section and said reflected light monitor section, such that a relative attenuation amount for the input power of the power of the wavelength channels output from each of said output ports becomes a previously set value.

7. An optical switch according to claim 1, wherein when said optical input/output section has M input ports and M output ports, and the wavelength multiplexed light input to each input port contains N wavelength channels where M and N are integers of two or more,
there is provided M×N input side movable mirrors that reflect each wavelength channel separated by said spectroscopic section by respective reflecting surfaces whose angles are variable, and M×N output side movable mirrors that reflect each wavelength channel reflected by said input side movable mirrors by respective reflecting surfaces whose angles are variable,
and said movable mirror driving section sets the angles of the reflecting surfaces of said input side movable mirrors and said output side movable mirrors such that the wavelength channel reflected in order by said input side movable mirrors and said output side movable mirrors is inserted via said spectroscopic section into an output port set in an output address of an appropriate wavelength channel among said plurality of output ports.

8. An optical switch according to claim 1, wherein said reflection section is an end face of a fiber of each of said output ports, which is ground vertically.

9. An optical switch according to claim 1, wherein there is provided a plurality of optical isolators with optical output ends connected to end faces of said output ports, and said reflection section is provided on the light input end of said optical isolators.

10. An optical switch according to claim 1, wherein said movable mirrors are micro mirrors formed by using a micromachining technique.

11. An optical switch according to claim 1, wherein said reflected light extracting section includes an optical circulator that has at least three ports.

12. An optical switch according to claim 1, wherein said reflected light monitor section comprises an optical filter whose transmission band is variable and into which light obtained by said reflection light extraction section is input, and a photo detector that detects the power of the transmitted light of said optical filter.

13. An optical switch according to claim 1, wherein said reflected light monitor section comprises a demultiplexer that separates the light obtained by said reflection light extraction section according to its wavelength, and a plurality of photo detectors that detect the power of the lights separated by said demultiplexer.

* * * * *